(12) United States Patent
Kenno

(10) Patent No.: US 9,567,811 B2
(45) Date of Patent: Feb. 14, 2017

(54) COUPLER FOR A ROTATABLE CUTTER ASSEMBLY

(71) Applicant: Kennametal Inc., Latrobe, PA (US)

(72) Inventor: Brandon J. Kenno, Windber, PA (US)

(73) Assignee: KENNAMETAL INC., Latrobe, PA (US)

( * ) Notice: Subject to any disclaimer, the term of this patent is extended or adjusted under 35 U.S.C. 154(b) by 289 days.

(21) Appl. No.: 14/029,292

(22) Filed: Sep. 17, 2013

(65) Prior Publication Data

US 2015/0080136 A1 Mar. 19, 2015

(51) Int. Cl.
*E21B 17/07* (2006.01)
*F16D 3/72* (2006.01)
(Continued)

(52) U.S. Cl.
CPC .............. *E21B 17/07* (2013.01); *E21B 17/046* (2013.01); *E21B 17/076* (2013.01); *F16D 1/104* (2013.01); *F16D 3/72* (2013.01); *F16D 2001/102* (2013.01)

(58) Field of Classification Search
CPC ............ F16L 31/00; F16L 33/30; F16L 37/02; F16L 37/025; F16L 37/092; F16L 37/0925; E21B 17/02; E21B 17/04; E21B 17/046; E21B 17/03; E21B 17/07; E21B 17/076; F16D 1/00; F16D 1/02; F16D 1/10; F16D 1/101; F16D 1/104; F16D 1/108; F16D 2001/102; F16D 2001/103; F16D 3/50; F16D 3/72; F16D 3/74; Y10T 403/453; Y10T 403/50; Y10T 403/54; Y10T 403/55; Y10T 403/553; Y10T 403/559; Y10T 403/57; Y10T 403/5793; Y10T 403/7018; Y10T 403/7021; Y10T 403/7022; Y10T 703/7026; Y10T 403/7098

See application file for complete search history.

(56) References Cited

U.S. PATENT DOCUMENTS 651,134 A * 6/1900 Dickens ................. F16L 35/00
                                      285/239
2,477,533 A * 7/1949 Whiting ................ F16L 17/035
                                      277/625

(Continued)

FOREIGN PATENT DOCUMENTS

DE     102012223994 A1 * 6/2014 ........... F02M 55/004
WO    WO2013103699 A1   7/2013

OTHER PUBLICATIONS

Mar. 30, 2016—First Office Action.

*Primary Examiner* — Matthieu Setliff
(74) *Attorney, Agent, or Firm* — Matthew S. Bedsole

(57) ABSTRACT

A coupler for use in connecting together in a driving relationship a first member and a second member in a rotatable cutter assembly includes an elongate body having an axial forward end and an axial rearward end, and the elongate body containing a longitudinal bore. The elongate body further includes a collar mediate of the axial forward end and the axial rearward end, a forward body portion axially forward of the collar wherein the forward body portion is configured to drivingly engage the first member and a rearward body portion rearward of the collar wherein the rearward body portion is configured to drivingly engage the second member. The rearward body portion of the elongate body includes an elastomeric layer formed thereon.

10 Claims, 4 Drawing Sheets

(51) Int. Cl.
*E21B 17/046* (2006.01)
*F16D 1/104* (2006.01)
*F16D 1/10* (2006.01)

(56) References Cited

U.S. PATENT DOCUMENTS

| | | | | |
|---|---|---|---|---|
| 3,714,993 | A * | 2/1973 | Nolley | E21B 21/00 173/78 |
| 5,738,387 | A * | 4/1998 | Guest | F16L 37/092 285/322 |
| 6,439,620 | B1 * | 8/2002 | Guest | F16L 33/18 285/239 |
| 7,207,400 | B2 * | 4/2007 | Bise | E21B 17/03 175/320 |
| 2015/0176343 | A1 * | 6/2015 | Michael | E21B 17/07 175/320 |

* cited by examiner

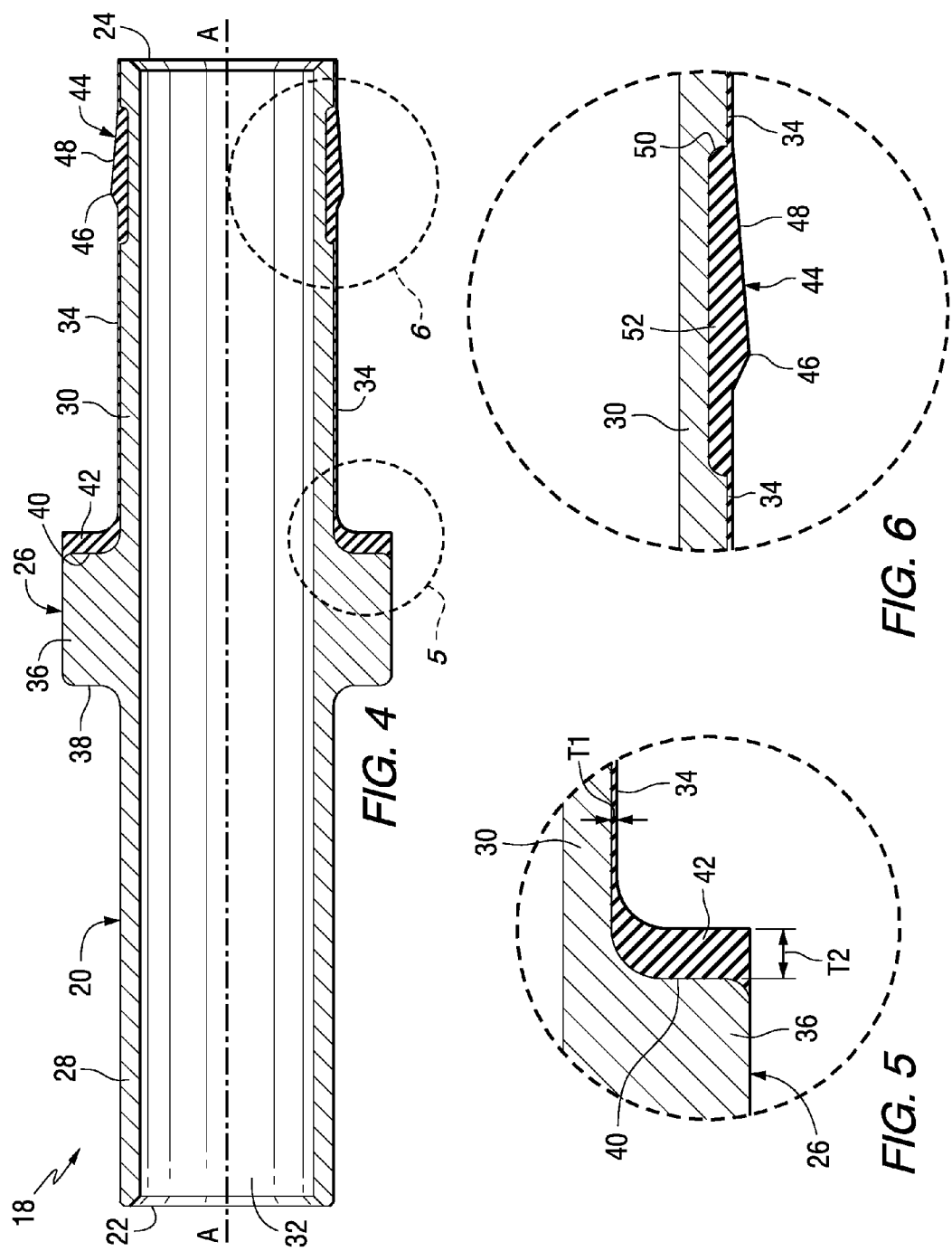

COUPLER FOR A ROTATABLE CUTTER ASSEMBLY

BACKGROUND OF THE INVENTION

The invention relates generally to a rotatable cutter assembly. More particularly, the invention relates to a coupler for a rotatable cutter assembly. In one aspect of the invention, the rotatable cutter assembly can be a drill assembly such as, for example, a roof bolt drill assembly, such as used in underground mining operations, that utilizes the coupler of the invention.

Expansion of an underground mine such as, for example, a coal mine, requires digging a tunnel. Initially this tunnel has an unsupported roof. In order to support and stabilize the roof in an established area in an underground tunnel, bore holes are drilled in the roof. Typically, the apparatus used to drill these holes comprises a drill with a long shaft, i.e., drill steel, attached to a drill bit. The roof drill bit is detachably mounted, either directly or through the use of a chuck, to the drill steel at the distal end thereof. To commence the drilling operation, the roof drill bit is then pressed against the roof and the drilling apparatus is operated so as to drill a bore hole in the roof. The bore holes may extend between two feet to greater than twenty feet into the roof. These bore holes are filled with resin and roof bolts are affixed within the bore holes. A roof support, such as roof panels, is then attached to the roof bolts.

One problem associated with the drilling operation for drilling the bore hole into the roof of the mine is that a large amount of noise is generated. Studies have shown that, on average, drilling noise is the most significant contributor to a roof bolting machine operator's noise exposure. Thus, hearing loss remains one of the most common occupational illnesses for underground miners.

Another problem associated with the drilling operation for drilling the bore hole into the roof of the mine is mechanical failure of one or more of the various components of the roof bolt drill assembly that typically results from one or more factors, such as, for example, the mechanical forces encountered in the drilling operation and the rigid connections between the various components of the roof bolt drill assembly.

Thus, it would be desirable to have a rotatable cutter assembly and associated components, such as couplers, that overcomes the problems of known such assemblies and associated components, particularly for drill assemblies used in roof bolt drilling operations.

SUMMARY OF THE INVENTION

In accordance with an aspect of the invention, a coupler for use in connecting together in a driving relationship a first member and a second member in a rotatable cutter assembly includes an elongate body having an axial forward end and an axial rearward end, a collar mediate of the axial forward end and the axial rearward end, a forward body portion axially forward of the collar wherein the forward body portion is configured to drivingly engage the first member and a rearward body portion rearward of the collar wherein the rearward body portion is configured to drivingly engage the second member. The rearward body portion of the elongate body includes a first elastomeric layer formed thereon and the collar includes a flange extending radially outward from the elongate body, the flange having a rearward surface adjacent the rearward body portion which includes a second elastomeric layer formed thereon that is contiguous with the first elastomeric layer. The rearward body portion of the elongate body further includes a plurality of elastomeric retainer elements formed about an outer periphery thereof and configured to engage the second driving member.

In accordance with another aspect of the invention, a coupler for use in connecting together in a driving relationship a first member and a second member in a rotatable cutter assembly includes an elongate body having an axial forward end and an axial rearward end, and the elongate body containing a longitudinal bore. The elongate body further includes a collar mediate of the axial forward end and the axial rearward end, a forward body portion axially forward of the collar wherein the forward body portion is configured to drivingly engage the first member and a rearward body portion rearward of the collar wherein the rearward body portion is configured to drivingly engage the second member. The rearward body portion of the elongate body includes an elastomeric layer formed thereon.

In accordance with an additional aspect of the invention, a sound dampening apparatus for use in connecting together in a driving relationship a first member and a second member in a rotatable cutter assembly includes an elongate body having an axial forward end and an axial rearward end, and the elongate body containing a longitudinal bore. The elongate body further including a collar mediate of the axial forward end and the axial rearward end, a forward body portion axially forward of the collar wherein the forward body portion is configured to drivingly engage the first member and a rearward body portion rearward of the collar wherein the rearward body portion is configured to drivingly engage the second member. The rearward body portion of the elongate body includes a layer of sound dampening material formed thereon.

These and other aspects of the invention will be more fully understood following a review of this specification and drawings.

BRIEF DESCRIPTION OF THE DRAWINGS

FIG. 4 is a sectional view taken along line 4-4 of FIG. 2, in accordance with an aspect of the invention.

FIG. 5 is an enlarged portion of FIG. 4 as shown, in accordance with an aspect of the invention.

FIG. 6 is an enlarged portion of FIG. 4 as shown, in accordance with an aspect of the invention.

DETAILED DESCRIPTION

In accordance with an aspect of the invention, there is provided a coupler for a rotatable cutter assembly. The rotatable cutter assembly may be any such type of assembly, but for exemplary purposes only a rotatable cutter assembly in the form of a roof bolt drill assembly 10 (see FIG. 1) is described and illustrated herein. Thus, it will be appreciated that the invention is not limited to a roof bolt drill assembly.

As will be appreciated from the description and drawings set forth herein, the invention advantageously provides for reduced noise during a drilling operation, as well as, improved mechanical durability and flexibility of the roof bolt drill assembly during the drilling operation.

Figure 1:
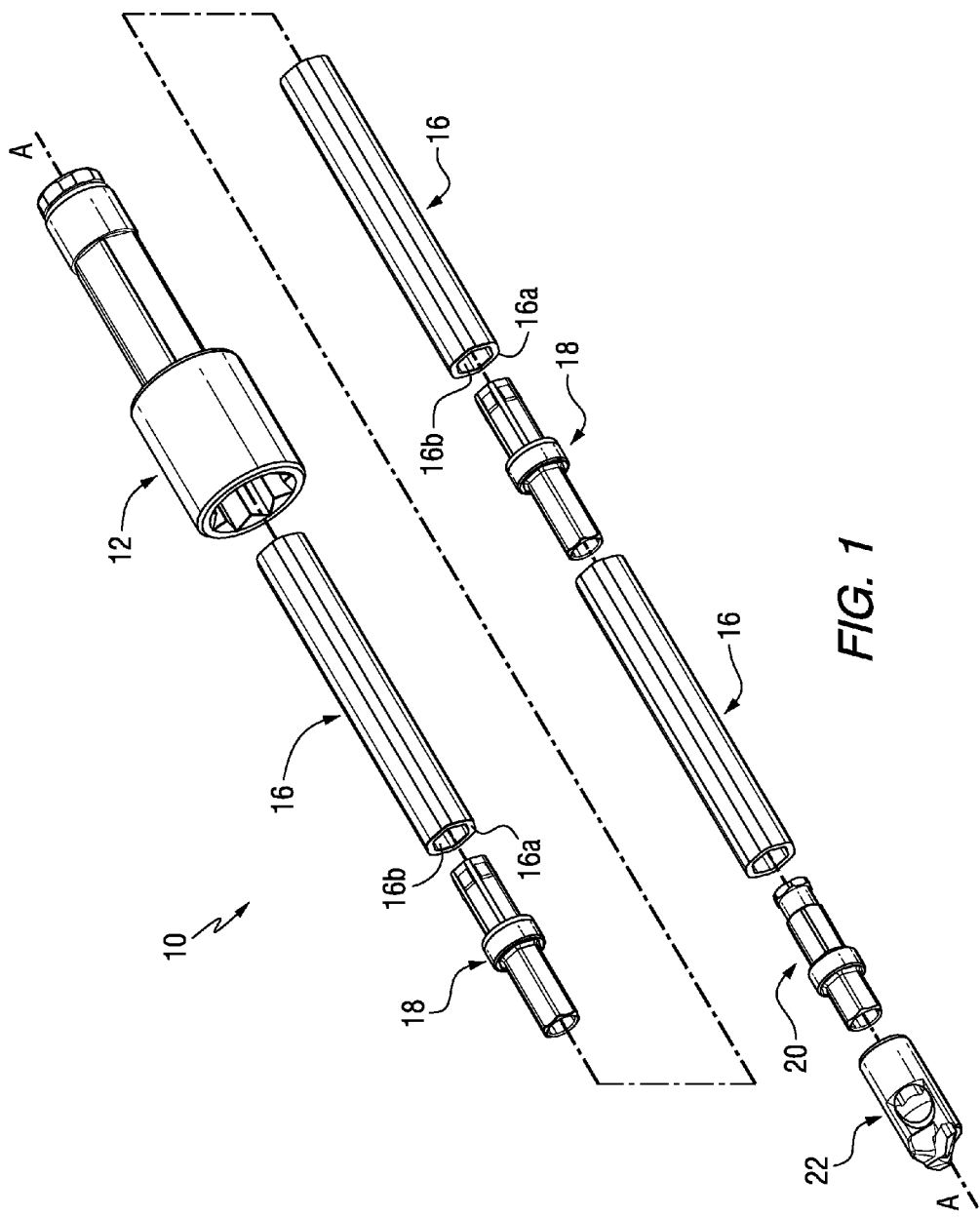
FIG. 1 is an exploded isometric view of a rotatable cutter assembly, in accordance with an aspect of the invention.
Figure 2:
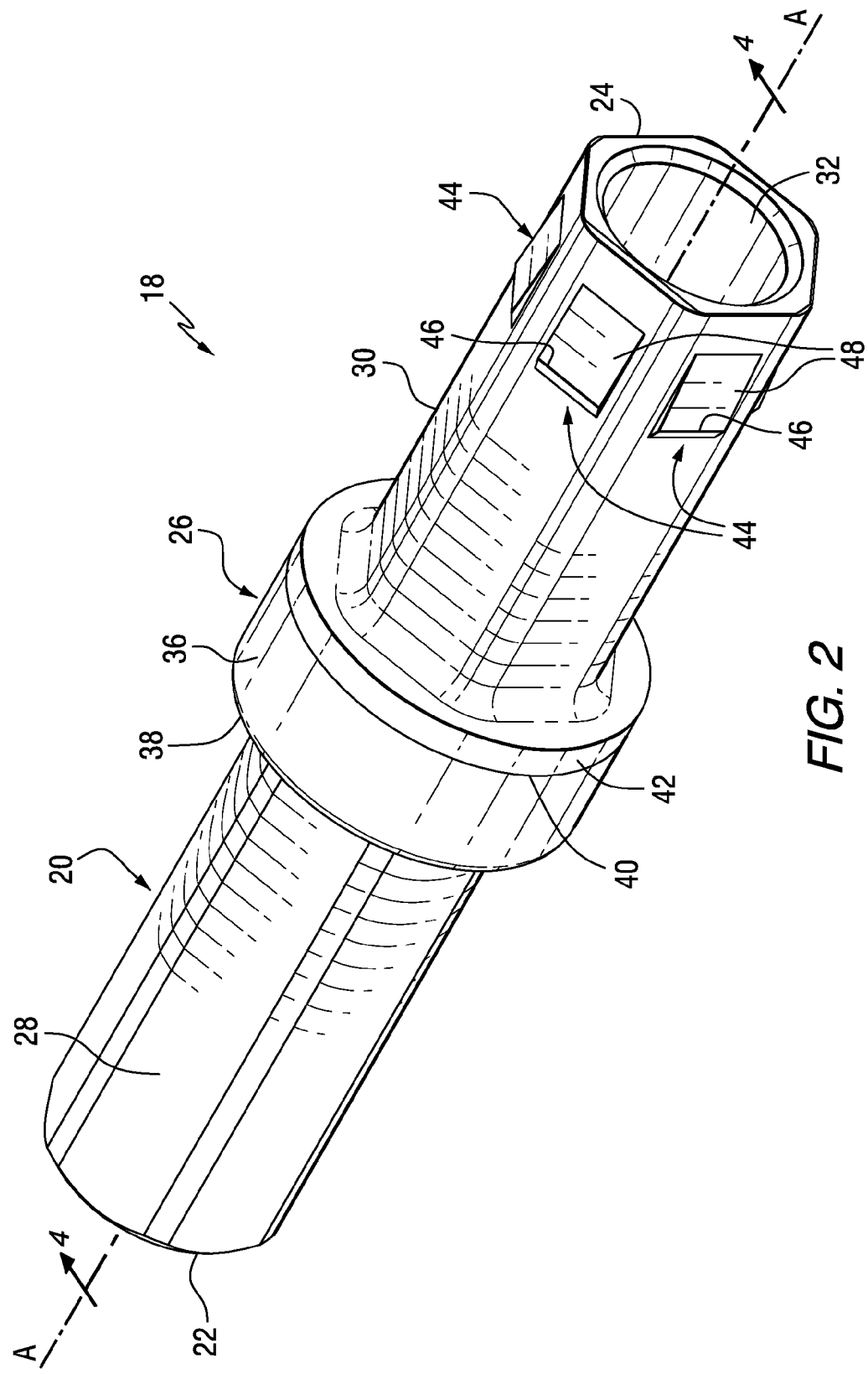
FIG. 2 is an isometric view of a coupler of the rotatable cutter assembly shown in FIG. 1, in accordance with an aspect of the invention.
Figure 3:
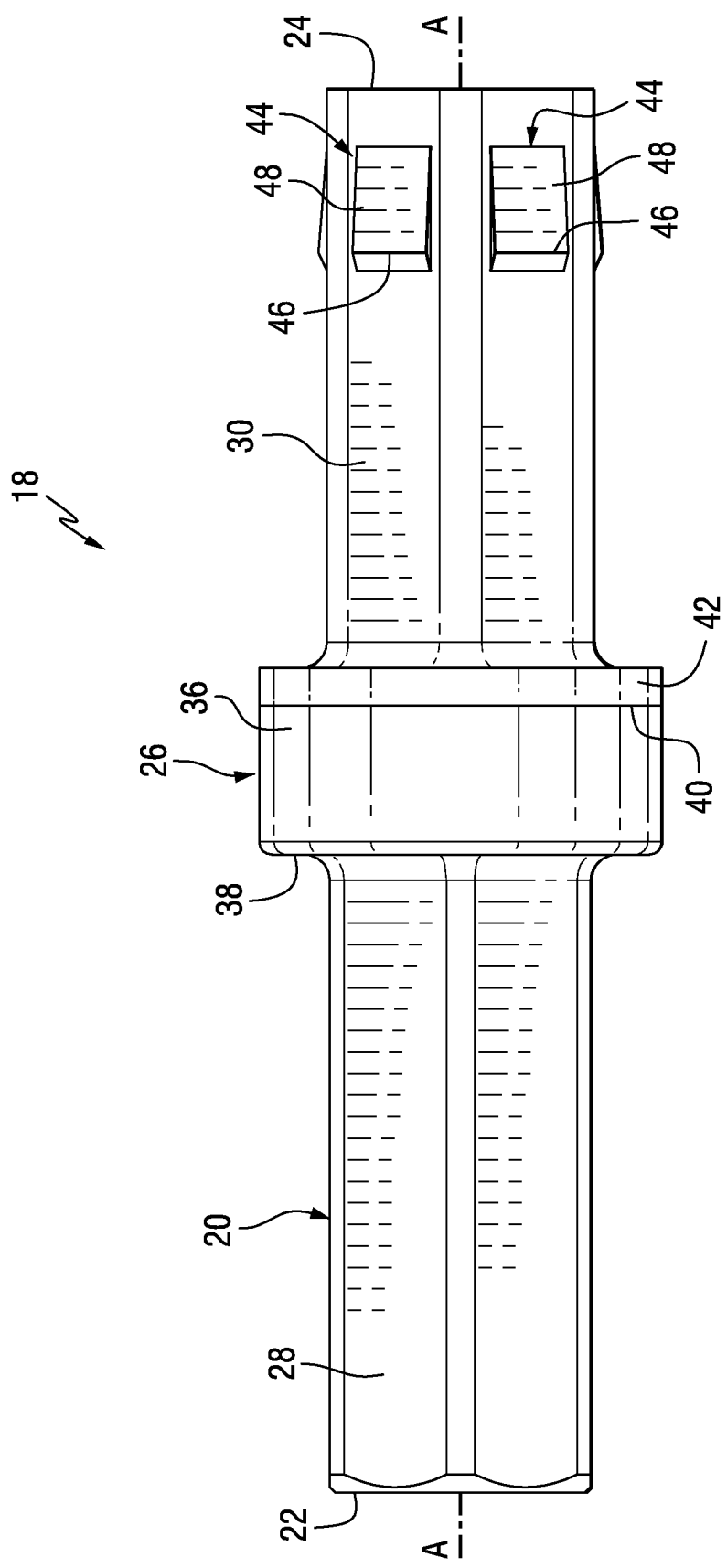
FIG. 3 is side view of the coupler of the rotatable cutter assembly shown in FIGS. 1 and 2, in accordance with an aspect of the invention.

Referring to the drawings, FIG. 1 illustrates the rotatable cutter assembly (e.g. a roof drill bit assembly 10) of the invention. The roof drill bit assembly 10 includes a chuck adapter (or chuck) generally designated as 12, one or more sections of drill steels each one of which is generally designated as 16, one or more couplers generally designated as 18 for attaching or connecting together in a driving relationship one or more members such as drill steels 16, and an adapter generally designated as 20 for attaching or connecting a roof drill bit generally designated as 22. The components of the roof drill bit assembly 10 are exploded along a common longitudinal axis A-A for sake of clarity. However, it should be appreciated that for the purpose of operation, these components would be assembled together to form an assembled roof drill bit assembly. The roof drill bit assembly 10 would also typically include a means for driving the assembly 10 which may be, for example, a drill or drilling machine, (not shown).

Referring to FIGS. 2-6, the coupler 18 is illustrated in more detail, in accordance with aspects of the invention. Specifically, the coupler 18 includes an elongate body 20 having an axial forward end 22 and an axial rearward end 24, a collar 26 that is generally central to or mediate of the axial forward end 22 and the axial rearward end 24. The coupler 18 further includes a forward body portion 28 axially forward of the collar 26 wherein the forward body portion 28 is configured to drivingly engage a first member such as, for example, one of the drill steels 16. The coupler 18 also includes and a rearward body portion 30 rearward of the collar 26 wherein the rearward body portion 30 is configured to drivingly engage a second member such as, for example, one of the drill steels 16. The elongate body 20 of the coupler 18 also may include a longitudinal bore 32 extending therethrough for delivering air/vacuum, water or coolant depending upon the desired type drilling operation desired.

In accordance with an aspect of the invention, the rearward body portion 30 of the elongate body 20 includes a first elastomeric layer 34 formed thereon. In one particular aspect, the elastomeric layer 34 can extend from adjacent the collar 26 to the axial rearward end 24 of the elongate body 20 so as to cover the generally the entire outer periphery of the rearward body portion 30.

In accordance with another aspect of the invention, the collar 26 includes a flange 36 extending radially outward from the elongate body 20, wherein the flange 36 includes a forward surface 38 adjacent the forward body portion 28 and a rearward surface 40 adjacent the rearward body portion 30. In one aspect, the rearward surface 40 of the flange 36 includes a second elastomeric layer 42 formed thereon. In another aspect, the second elastomeric layer 42 is contiguous with the first elastomeric layer 34, e.g. the first elastomeric layer 34 and the second elastomeric layer 42 are in contact and form a continuous or uninterrupted elastomeric surface.

When the roof drill bit assembly 10 is assembled, the rearward body portion 30 of the coupler 18 is inserted in one of the drill steels 16 such that a first end 16a of the drill steel 16 engages or contacts the second elastomeric layer 42 formed on the rearward surface 40 of the flange 36. In addition, an inner surface 16b of the drill steels 16 is configured to engage or contact similarly configured first elastomeric layer 34 formed on the rearward body portion 30 in, for example, a press fit arrangement so as to provide a driving engagement relationship therebetween. Typically, the drill steels 16 are formed of a hard, rigid material such as, for example, steel. However, the elastomeric layers 34, 42 are formed of a material that is generally less hard or less rigid in comparison to the material used to form the drill steels 16 (or other components that coupler 18 may be used in association with as well). For example, elastomeric layers 34, 42 can be constructed from polyisoprene, a polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, silicone, or other heavily damped elastomer. Accordingly, it will be appreciated that the elastomeric layers 34, 42 are advantageously configured so as to reduce, suppress and/or dampen the sounds, noises and/or vibrations generated by the assembly 10 during operation. If the coupler 18 were constructed without the elastomeric layers 34, 42 and otherwise constructed of a hard, rigid material the same as or similar to the drill steel 16 material, there would be a large amount of sounds, noises and/or vibrations generated by the assembly 10 during operation. Such sounds, noises and/or vibrations generated by the assembly 10 during operation are generally undesirable, particularly in an underground mining environment. As used herein, "layer" or "elastomeric" or "elastomeric layer" or like phrases can include one or more layers of elastomeric material for tuning or adjusting noise reduction or suppression.

As shown in FIG. 5, the first elastomeric layer 34 formed on the rearward body portion 30 has a first thickness T1 that is less than a second thickness T2 of the second elastomeric layer 42 formed on the rearward surface 40 of the flange 36. The second elastomeric layer 42 is thicker due to the nature of the contact and interaction between the end 16a of the drill steel 16 therewith as described.

In accordance with another aspect of the invention, the rearward body portion 30 of the elongate body 20 includes an elastomeric retainer element 44 formed thereon and configured to engage a driving member, e.g. one of the drill steels 16 or other components. In one aspect, the rearward body portion 30 of the elongate body 20 includes a plurality of elastomeric retainer elements 44 formed about an outer periphery thereof.

The elastomeric retainer element 44 includes a raised projection 46 extending radially outward from the elongate body 20. The elastomeric retainer element 44 further includes a bearing surface 48 that slopes axially inwardly from the raised projection 46 toward the axial rearward end 24 of the elongate body 20. Advantageously, the elastomeric retainer element 44 is configured to facilitate the coupler 18 being inserted into the drill steel 16 while also resisting the coupler 18 and the drill steel 16 from becoming disconnected. Specifically, the bearing surface 48 is sloped as described to allow for the end 16a and inner surface 16b of the drill steel to pass over the elastomeric retainer element 44 when connecting the coupler 18 and the drill steel 16. Once assembled, the inner surface 16b of the drill steel 16 engages the raised projection 46 to provide a press fit or interference fit therebetween that provides resistance to the coupler 18 and the drill steel 16 from becoming disconnected or separated during use of the drill assembly 10.

In another aspect of the invention, the rearward body portion 30 of the elongate body 20 includes a recess 50 formed therein for receiving an inner portion 52 of the elastomeric retainer element 44. This configuration aids in maintaining the elastomeric retainer element 44 in position and secured to the rearward body portion 30.

In another aspect, the elastomeric retainer element 44 is contiguous with the first elastomeric layer 34, e.g. the first elastomeric layer 34 and the elastomeric retainer element 44 are in contact and form a continuous or uninterrupted elastomeric surface that covers the rearward body portion 30.

Advantageously, configuring the coupler 18 and, in particular, the first elastomeric layer 34, the second elastomeric layer 42 and/or the elastomeric retainer element 44 of the coupler 18 as described and illustrated herein, provides for the coupler 18 to act as a sound dampening apparatus capable of providing absorption and dissipation of the energy during a drilling operation so as to minimize or reduce the noise, sound and/or vibration that occurs during a drilling operation and, in particular, during a roof bolt drilling operation.

In addition to the coupler 18 of the invention acting as a sound dampening apparatus capable of providing absorption and dissipation of the energy during a drilling operation so as to minimize or reduce the noise, sound and/or vibration that occurs during a drilling operation, the coupler 18 of the invention also advantageously reduces the potential for mechanical failure of the roof bolt drill assembly 10 during operation. Specifically, the coupler 18 by having the first elastomeric layer 34, the second elastomeric layer 42 and/or the elastomeric retainer element 44 provides for reduced or decreased wear between the coupler 18 and the drill steel 16 as well as increases the overall life of other components of the assembly 10 due to, fore example, reduced vibrational wear. The coupler 18 of the invention allows for the stiffness or rigidity of the assembly 10 to be controlled or adjusted as desired to reduce or minimize mechanical failure of the various components that make up the assembly 10. For example, previously known roof bolt drill assemblies would have a stiff or rigid mechanical connection between couplers and drill steels. During operation, these components experienced large mechanical stresses and/or forces due to the nature of the roof bolt drilling process. Thus, it will be appreciated that the coupler 18 of the present invention advantageously reduces the mechanical stresses and/or forces that the drill assembly components are subjected to as a result of the coupler 18 having the first elastomeric layer 34, the second elastomeric layer 42 and/or the elastomeric retainer element 44.

Whereas particular embodiments of this invention have been described above for purposes of illustration, it will be evident to those skilled in the art that numerous variations of the details of the present invention may be made without departing from the invention as defined in the appended claims.

What is claimed is:

1. A coupler for use in connecting together in a driving relationship a first member and a second member in a rotatable cutter assembly, the coupler comprising:
   an elongate body having an axial forward end, an axial rearward end, a collar mediate of the axial forward end and the axial rearward end, a forward body portion axially forward of the collar, and a rearward body portion rearward of the collar,
   wherein the forward body portion has a polygonal outer peripheral surface that is configured to drivingly engage the first member along an exterior of the forward body portion;
   wherein the rearward body portion is configured to drivingly engage the second member along an exterior of the rearward body portion;
   wherein the rearward body portion of the elongate body includes:
      a first elastomeric layer formed thereon;
      a plurality of elastomeric retainer elements formed about an outer periphery of the rearward body portion configured to engage the second member, each of the elastomeric retainer elements including:
         a raised projection extending radially outward from the elongate body; and
         a bearing surface that slopes axially inwardly at a non-zero angle and thereby decreases in thickness relative to an external profile of the elongate body from the raised projection toward the axial rearward end of the elongate body; and
      a recess for receiving an inner portion of the elastomeric retainer element; and
   wherein the collar includes a flange extending radially outward from the elongate body, the flange having a rearward surface adjacent the rearward body portion which includes a second elastomeric layer formed thereon that is contiguous with the first elastomeric layer.

2. The coupler of claim 1, wherein the first elastomeric layer formed on the rearward body portion has a first thickness that is less than a second thickness of the second elastomeric layer formed on the rearward surface of the flange; and
   wherein the second thickness of the second elastomeric layer is measured continuously from the rearward surface of the flange in a direction generally perpendicular to the rearward surface of the flange.

3. A coupler for use in connecting together in a driving relationship a first member and a second member in a rotatable cutter assembly, the coupler comprising:
   an elongate body containing a longitudinal bore and having an axial forward end, an axial rearward end, a collar mediate of the axial forward end and the axial rearward end, a forward body portion axially forward of the collar, and a rearward body portion rearward of the collar,
   wherein the forward body portion has a polygonal outer peripheral surface that is configured to drivingly engage the first member along an exterior of the forward body portion;
   wherein the rearward body portion is configured to drivingly engage the second member along an exterior of the rearward body portion;
   wherein the rearward body portion of the elongate body includes:
      an elastomeric layer formed thereon;
      an elastomeric retainer element formed thereon and configured to engage the second member, the elastomeric retainer element including:
         a raised projection extending radially outward from the elongate body; and
         a bearing surface that slopes axially inwardly at a non-zero angle and thereby decreases in thickness relative to an external profile of the elongate body from the raised projection toward the axial rearward end of the elongate body; and
      a recess for receiving an inner portion of the elastomeric retainer element.

4. The coupler of claim 3, wherein the collar includes a flange extending radially outward from the elongate body, the flange having a forward surface adjacent the forward body portion and a rearward surface adjacent the rearward body portion, wherein the rearward surface includes an additional elastomeric layer formed thereon.

5. The coupler of claim 4, wherein the elastomeric layer formed on the rearward body portion is contiguous with the additional elastomeric layer formed on the rearward surface of the flange.

6. The coupler of claim 4, wherein the elastomeric layer formed on the rearward body portion has a first thickness that is less than a second thickness of the additional elastomeric layer formed on the rearward surface of the flange; and wherein the second thickness of the second elastomeric layer is measured continuously from the rearward surface of the flange in a direction generally perpendicular to the rearward surface of the flange.

7. The coupler of claim 3, wherein the elastomeric layer formed on the rearward body portion is contiguous with the elastomeric retainer element.

8. The coupler of claim 3, wherein the elastomeric layer formed on the rearward body portion extends from the collar to the axial rearward end of the elongate body.

9. A sound dampening apparatus for use in connecting together in a driving relationship a first member and a second member in a rotatable cutter assembly, the sound dampening apparatus comprising:

an elongate body containing a longitudinal bore and having an axial forward end, an axial rearward end, a collar mediate of the axial forward end and the axial rearward end, a forward body portion axially forward of the collar and a rearward body portion rearward of the collar, wherein the forward body portion has a polygonal outer peripheral surface that is configured to drivingly engage the first member along an exterior of the forward body portion;

wherein the rearward body portion is configured to drivingly engage the second member along an exterior of the rearward body portion;

wherein the rearward body portion of the elongate body includes:

a layer of sound dampening material formed thereon;

a retainer element formed of a sound dampening material configured to engage the second member, and the retainer element including:

a raised projection extending radially outward from the elongate body; and a bearing surface that slopes axially inwardly at a non-zero angle and thereby decreases in thickness relative to an external profile of the elongate body from the raised projection toward the axial rearward end of the elongate body; and a recess for receiving an inner portion of the elastomeric retainer element.

10. The sound dampening apparatus of claim 9, wherein the collar includes a flange extending radially outward from the elongate body, the flange having a rearward surface adjacent the rearward body portion which includes an additional layer of sound dampening material formed thereon that is contiguous with the layer of sound dampening material formed on the rearward body portion.

* * * * *